United States Patent
Hayashi et al.

(10) Patent No.: US 7,421,211 B2
(45) Date of Patent: Sep. 2, 2008

(54) LIGHT SOURCE DEVICE

(75) Inventors: Akihiko Hayashi, Yokohama (JP); Kensuke Matsui, Yokohama (JP); Hirokazu Osada, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/054,554

(22) Filed: Feb. 10, 2005

(65) Prior Publication Data

US 2005/0201443 A1    Sep. 15, 2005

Related U.S. Application Data

(63) Continuation of application No. PCT/JP2003/001700, filed on Feb. 18, 2003.

(51) Int. Cl.
*H04B 10/02* (2006.01)

(52) U.S. Cl. ..................... 398/196; 396/175

(58) Field of Classification Search ............... 372/69, 372/29.01, 29.014, 29.02; 398/192–201, 398/175
See application file for complete search history.

(56) References Cited

U.S. PATENT DOCUMENTS

| | | | | | |
|---|---|---|---|---|---|
| 5,532,865 | A | * | 7/1996 | Utsumi et al. ............. | 398/1 |
| 5,805,321 | A | * | 9/1998 | Ooi et al. .................. | 398/98 |
| 5,920,414 | A | * | 7/1999 | Miyachi et al. ............ | 398/14 |
| 5,991,060 | A | * | 11/1999 | Fishman et al. ........... | 398/198 |
| 6,014,235 | A | * | 1/2000 | Norte ........................ | 398/180 |
| 6,204,945 | B1 | * | 3/2001 | Iwata et al. ................ | 398/9 |
| 6,473,225 | B1 | * | 10/2002 | Zami et al. ................ | 359/344 |
| 6,643,040 | B2 | * | 11/2003 | Shen et al. ................ | 359/107 |
| 6,687,039 | B2 | * | 2/2004 | Shirai ....................... | 359/254 |
| 6,895,028 | B2 | * | 5/2005 | Sugawara ................. | 372/38.02 |

FOREIGN PATENT DOCUMENTS

| | | | |
|---|---|---|---|
| JP | 03/251815 | A | 1/1991 |
| JP | 08-248366 | A | 9/1996 |
| JP | 09-008738 | A | 1/1997 |
| JP | 10-032362 | A | 2/1998 |
| JP | 2000-332344 | A | 11/2000 |
| JP | 2001-027746 | A | 1/2001 |

* cited by examiner

*Primary Examiner*—Jason Chan
*Assistant Examiner*—Danny W Leung
(74) *Attorney, Agent, or Firm*—Staas & Halsey LLP

(57) ABSTRACT

A light source device has a continous wave (CW) light source for emitting first direct current (DC) light, a level converter for converting optical electric power of the first DC light into second DC light and outputting the second DC light, and a mixer for mixing an optical main signal having a constant extinction ratio with the second DC light.

2 Claims, 15 Drawing Sheets

LIGHT SOURCE DEVICE

This is a continuation of International PCT Application No. PCT/JP2003/001700, file Feb. 18, 2003, which was not published in English.

BACKGROUND OF THE INVENTION

1. Field of the Invention

The present invention relates to a light source device for use in evaluating the characteristics of an optical module such as an optical receiver or the like by intentionally superposing noise to degrade the waveform of an optical signal transmitted over an optical communication system when the extinction ratio is to be set to a random value without degrading the characteristics of the waveform of the transmitted optical signal in testing the transmission characteristics of the optical communication system.

2. Description of the Related Art

Optical modules such as receivers or the like are evaluated for their characteristics based on the cross-point level, positive-going edge, and negative-going edge of an input optical signal, the extinction ratio, and the simulation of an intersymbol interference due to an interference signal. The extinction ratio is varied by a direct modulation system using a light-emitting element such as an light-emitting diode (hereinafter referred to as "LD") or a modulation system using an external modulator such as $LiNbO_3$(LN), electro-absorption (EA), or the like.

FIG. 15 of the accompanying drawings shows a conventional direct modulation system. FIG. 16 of the accompanying drawings illustrates a process for varying the extinction ratio with the direct modulation system. In FIG. 16, the horizontal axis represents an LD current and the vertical axis an optical output power. As shown in FIG. 16, a light source (LD) 10 emits light when the LD current exceeds a threshold value Ith, and the optical output power increases as the LC current increases. The direct modulation system controls the optical output power of the LD 10 with the LD current supplied from a driver 12. As shown in FIG. 16, the extinction ratio is controlled by a biased value IB for the LD current which determines a low optical output power level P0 of a main signal and an amplitude IP of the LD current which determines a high optical output power level P1 of the main signal. The extinction ratio is expressed by the following equation (1):

$$\text{Extinction ratio} = 10 \times \log(P1/P0) \quad (1)$$

FIG. 17 of the accompanying drawings shows an LN modulation system. FIG. 18 of the accompanying drawings illustrates a process of varying the extinction ratio with the LN modulation system. In FIG. 18, the horizontal axis represents a drive voltage and the vertical axis an optical output power. As shown in FIG. 17, an LN modulator 24 has its optical output power variable in certain periodic cycles as the drive voltage output from a driver 22 changes. A low input signal level is converted into a drive voltage level V0 and a high input signal level is converted into a drive voltage level V1 by the driver 22. These drive voltage levels are input to the LN modulator 24, which modulates DC light from a light source 20 with the drive voltage. Optical output power levels which correspond to the drive voltage levels V0, V1 at the time the optical output power is turned on and off are determined, thus determining an extinction ratio. In this manner, the extinction ratio is varied by controlling the drive voltage levels V0, V1.

FIG. 19 of the accompanying drawings shows an EA modulation system. FIG. 20 of the accompanying drawings illustrates a process of varying the extinction ratio with the EA modulation system. In FIG. 19, the horizontal axis represents a drive voltage and the vertical axis an optical output power. As shown in FIG. 20, an EA modulator 34 has its optical output power reduced as the drive voltage output from a driver 32 increases. A low input signal level is converted into a drive voltage level V0 and a high input signal level is converted into a drive voltage level V1 by the driver 32. These drive voltage levels are input to the EA modulator 34, which modulates DC light from a light source 30 with the drive voltage. Optical output power levels which correspond to the drive voltage levels V0, V1 at the time the optical output power is turned on and off are determined, thus determining an extinction ratio. In this manner, the extinction ratio is varied by controlling the drive voltage levels V0, V1.

A patent document indicated below discloses a system for controlling an external modulator to prevent the extinction ratio of an output optical signal from being degraded due to an operation drift independently of an input signal.

Patent Document:
Japanese Patent Laid-Open No. Hei 3-251815

The following methods are available for superposing noise.

FIG. 21 of the accompanying drawings illustrates a method of superposing noise. As shown in FIG. 21, for superposing noise, an electric main signal and an electric interference signal are mixed with each other by a mixer 42. The mixer 42 inputs the mixed signal to a driver 44. The driver 44 outputs a drive voltage, which comprises the main signal including the interference signal, to modulate DC light from a light source 40 with an external modulator 46.

FIG. 22 of the accompanying drawings shows another method of superposing noise. An optical interference wave shown in FIG. 22 is converted in level by a level converter 60, and then mixed with an optical main signal shown in FIG. 22 by a mixer 62. An optical output signal from the mixer 62 is converted in level by a level converter 64, which outputs an optical output signal shown in FIG. 22.

According to an aspect of the present invention, there is provided a light source device comprising a continuous wave (CW) light source for emitting first direct current (DC) light, a level converter for converting optical electric power of the first DC light into second DC light and outputting the second DC light, and a mixer for mixing an optical main signal having a constant extinction ratio with the second DC light. According to the method of superposing noise as shown in FIG. 21, it is difficult to design the mixer 42 because attention needs to be paid to electric connections in view of the impedance matching and RF characteristics of the interference signal and the main signal. According to the method of superposing noise as shown in FIG. 22, the maximum high level power is represented by the sum of the high level power of the main signal and the maximum power of the interference wave and the sum of the low level power of the main signal and the minimum power of the interference wave. Since the extinction ratio of the optical output varies depending on the magnitude of the interference wave, the magnitude of the interference wave cannot be changed while the extinction ratio is being constant.

SUMMARY OF THE INVENTION

It is an object of the present invention to provide a light source device which is of a simple arrangement and high quality for meeting demands for setting the extinction ratio to a random value without degrading the characteristics of the waveform of a transmitted optical signal and for intentionally superposing noise to degrade the waveform of a transmitted optical signal.

According to an aspect of the present invention, there is provided a light source device comprising a CW light source for emitting first DC light, a level converter for converting optical electric power of the first DC light into second DC light and outputting the second DC light, and a mixer for mixing an optical main signal having a constant extinction ratio with the second DC light.

According to another aspect of the present invention, there is provided a light source device comprising a first CW light source for emitting first DC light, a first driver for outputting an electric main signal, a second driver for outputting an electric interference signal having an amplitude smaller than the electric main signal, and a dual-drive external modulator for modulating the first DC light based on the electric main signal and the electric interference signal to output an optical main signal.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
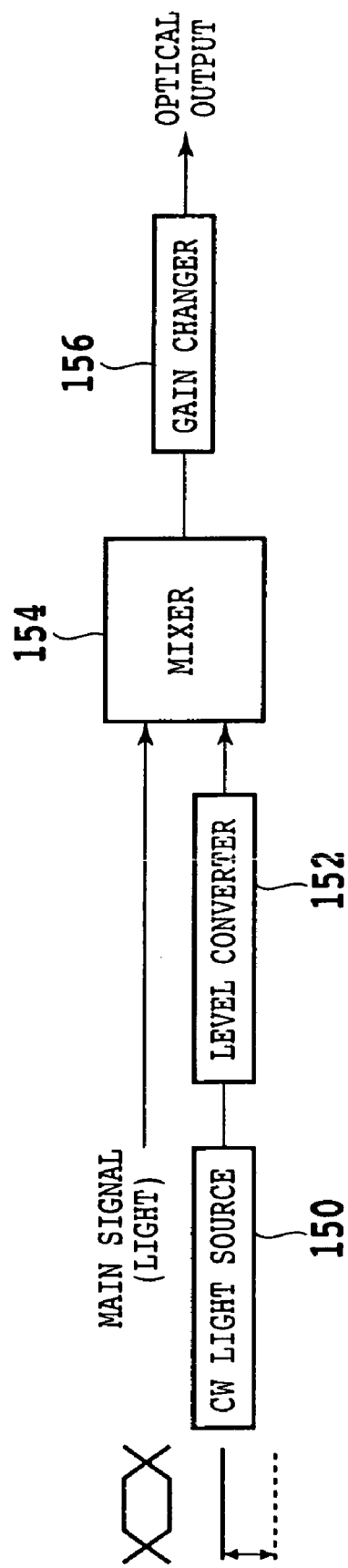
FIG. 1 is a diagram illustrating the principles of the present invention.

Prior to describing embodiments of the present invention, the principles of the present invention will be described below. FIG. 1 is a diagram illustrating the principles of the present invention. As shown in FIG. 1, a light source device has a CW light source 150, a level converter 152, a mixer 154, and a gain changer 156. The CW light source 150 emits CW light of constant power. The power of the CW light is represented by the solid line, and the 0 level thereof by the broken line. The level converter 152 converts the power of the CW light. The mixer 154 mixes an optical main signal with the CW light output from the level converter 152, and outputs the mixed signal to the gain changer 156. If the power of the CW light output from the level converter 152 is represented by $\Delta P$, the high level power of the optical main signal by P1, and the low level power thereof by P0, then since the high level power of the output signal light from the mixer 154 is represented by $(P1+\Delta P)$ and the low level power thereof by $(P0+\Delta P)$, the extinction ratio is expressed by the following equation (2):

$$\text{Extinction ratio} = 10 \times \log(((P1+\Delta P)/(P0+\Delta P))) \quad (2)$$

As indicated by the equation (2), the extinction ratio can be changed by changing the power $\Delta P$ of the CW light with the level converter 152 without changing the extinction ratio of the optical main signal. Therefore, to reduce the extinction ratio, the power $\Delta P$ of the CW light may be increased without changing the extinction ratio of the optical main signal. The gain changer 156 amplifies and attenuates the output optical signal from the mixer 156 at a predetermined gain. At this time, the high level power or the low level power can be changed without changing the extinction ratio of the output optical signal from the mixer 156.

First Embodiment

Figure 2:
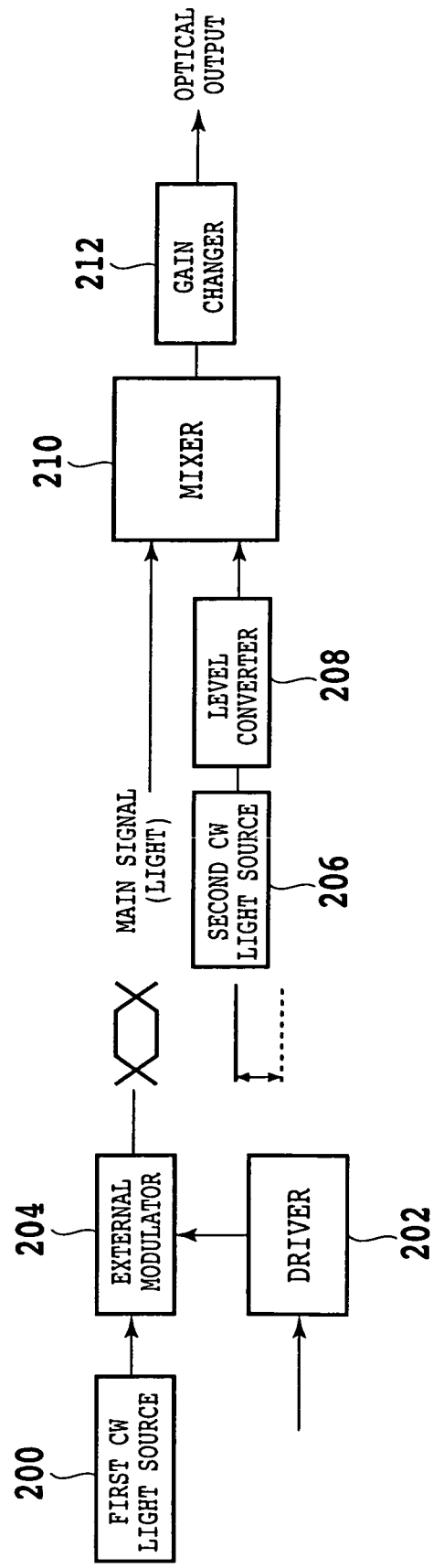
FIG. 2 is a diagram of a light source device according to a first embodiment of the present invention.

FIG. 2 is a diagram of a light source device according to a first embodiment of the present invention. As shown in FIG. 2, the light source device has a first CW light source 200, a driver 202, an external modulator 204, a second CW light source 206, a level converter 208, a mixer 210, and a gain changer 212. The first CW light source 200, the driver 202, and the external modulator 204 are components for outputting an optical main signal. The first CW light source 200 is a light source for emitting DC light. The driver 202 is supplied with an electric main signal and outputs a drive voltage having voltage levels corresponding to high and low levels of the electric main signal. The external modulator 204 comprises an LN modulator or an EA modulator for modulating the DC light with the drive voltage and outputting the modulated light as an optical main signal. The low and high level powers of the optical main signal are determined by the bias voltage and modulated amplitude of the drive voltage. The extinction ratio of the optical main signal is set such that it is free from noise due to a distortion of the drive waveform, ringing, etc. The optical main signal may be output according to a modulation system which directly modulates the DC light from the first CW light source 200. In this case, the external modulator 204 is not used.

The second CW light source 206 is a light source for emitting DC light of constant power. The level converter 208 is a circuit for converting the level of the power of the DC light. The level converter 208 is provided for keeping constant the power of the DC light from the second CW light source 206 to set the power of the DC light to a desired level. The mixer 210 comprises an optical coupler or the like for combining the optical main signal from the external modulator 206 with the DC light from the level converter 208. The gain changer 212 serves to change the gain while keeping constant the extinction ratio of the optical output signal from the mixer 210. The gain chamber 212 may be replaced with a level converter.

Figure 3:
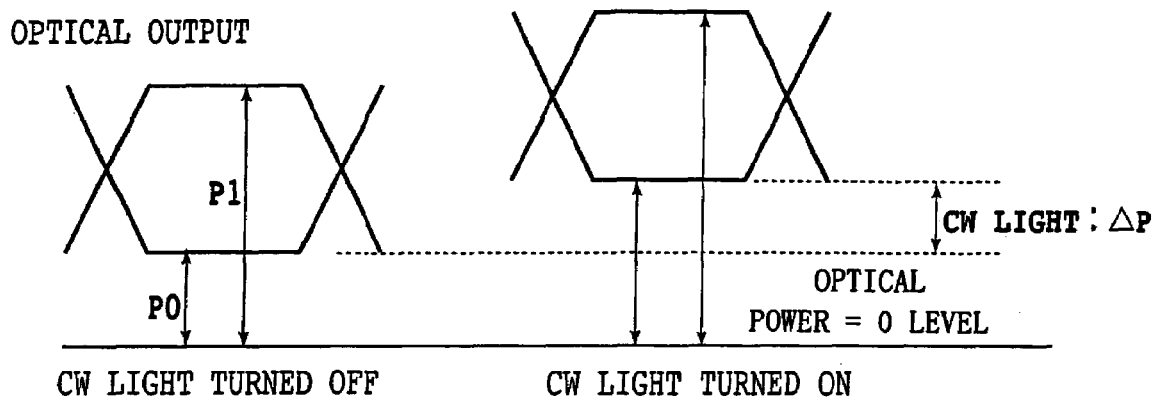
FIG. 3 is a diagram illustrating operation of the light source device shown in FIG. 2.

FIG. 3 is a diagram illustrating operation of the light source device shown in FIG. 2. Operation of the light source device shown in FIG. 2 will be described below with reference to FIG. 3. When the CW light is turned off in FIG. 3, the driver 202 outputs the drive voltage such that the optical main signal from the external modulator 204 has a low power level P0 and a high power level P1. These power levels P1, P0 are set such that the extinction ratio is of an upper limit value according to standards or the like. It is assumed, for example, that the upper limit value for the extinction ratio is 13 dB.

The external modulator 204 modulates the CW light from the first CW light source 200 with the drive voltage output from the driver 202 to output the optical main signal. The second CW light source 206 emits DC light. The level converter 208 converts the power of the DC light. It is assumed that the power of the DC light converted in level by the level converter 208 is represented by ΔP. The mixer 210 mixes the optical main signal output from the external modulator 204 with the DC light output from the level converter 208. The power of the optical main signal output from the mixer 210 is represented by the sum of the power of the optical main signal output from the external modulator 204 and the power of the DC light, when the CW light is turned on in FIG. 3.

Figure 4:
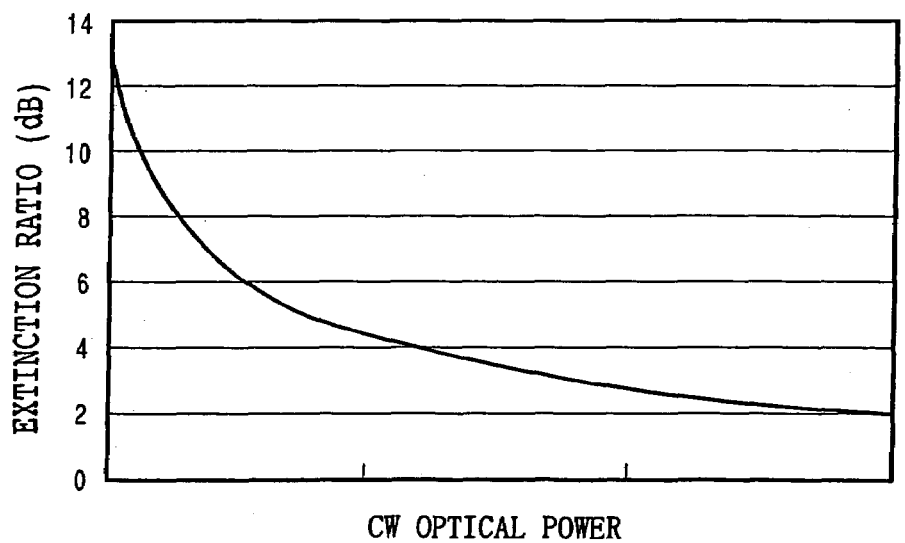
FIG. 4 is a diagram showing the relationship between CW optical electric power and the extinction ratio.

FIG. 4 is a diagram showing the relationship between CW optical electric power and the extinction ratio. In FIG. 4, the horizontal axis represents the CW optical electric power and the vertical axis the extinction ratio (dB). In FIG. 4, the extinction ratio at the time the CW optical electric power is 0 is 13 dB. Since the optical low level power of the output signal light from the mixer 210 is represented by (P0+ΔP) and the optical high level power thereof by (P1+ΔP), the extinction ratio thereof is expressed by the equation (2).

The relationship between the extinction ratio and the CW optical electric power ΔP according to the equation (2) as shown in FIG. 4 indicates that the extinction ratio monotonously decreases as the CW optical electric power increases. Therefore, the extinction ratio may be set to a desired value by setting the CW optical electric power ΔP to a value corresponding to the desired extinction ratio. At this time, there is no need to change the extinction ratio of the optical signal output from the external modulator 204. When the extinction ratio is to be reduced, since the CW optical electric power ΔP may be increased, noise at high and low levels of the optical output is not increased due to a distortion of the drive waveform, ringing, etc. The gain changer 212 variably controls the optical power without changing the extinction ratio of the output signal light from the mixer 210. The gain changer 212 may be replaced with a level converter, which may be placed between the external modulator 204 and the mixer 210. Instead of using the level converter 208, the power of the CW light from the second CW light source 206 may be changed by changing the drive current.

Second Embodiment

Figure 5:
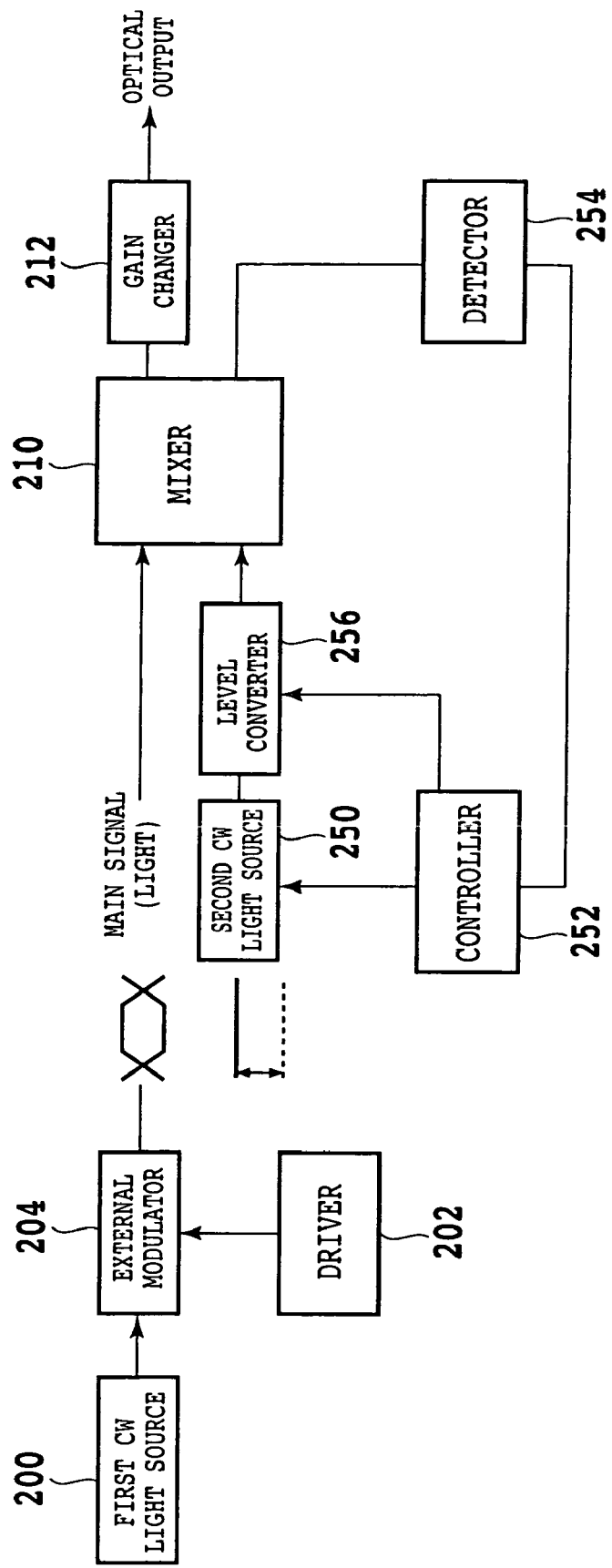
FIG. 5 is a diagram of a light source device according to a second embodiment of the present invention.

FIG. 5 is a diagram of a light source device according to a second embodiment of the present invention. Those parts of the light source device according to the second embodiment which are identical to those of the light source device shown in FIG. 2 are denoted by identical reference characters. According to the present embodiment, there are added, to the light source device shown in FIG. 2, a function to control the wavelength of a second CW light source 250 so that no beat noise will be included in the output signal light from the mixer 210 and a function to control the conversion level of a level converter 256. The beat noise is noise generated when two signals having different wavelengths are input, and is present as degrading an eye pattern or the like, changing the extinction ratio. The frequency of the beat noise is equal to the difference between the frequencies of the two optical signals. To avoid such beat noise, the wavelength of the second CW light source 250 is controlled to keep constant the difference between the wavelength of the main signal and the wavelength of the CW light source. The second SW light source 250 is a light source where the wavelength of DC light is variably controlled by a controller 252. The level converter 256 has its conversion level controlled by the controller 252.

Figure 6:
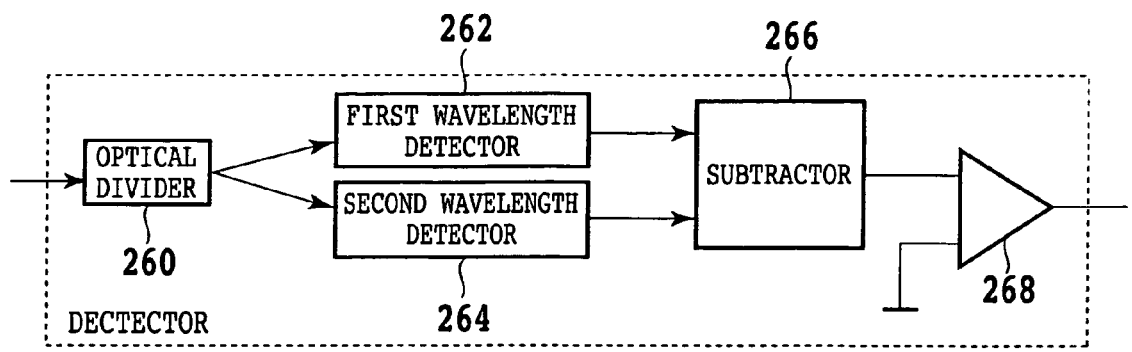
FIG. 6 is a diagram of a detector in the light source device shown in FIG. 5.

FIG. 6 is a diagram of a detector 254 in the light source device shown in FIG. 5. As shown in FIG. 6, the wavelength detector 254 has an optical divider 260, a first wavelength detector 262, a second wavelength detector 264, a subtractor 266, and an operational amplifier 268. The optical divider 260 divides an optical signal into a main signal and CW light, and outputs the main signal to the first wavelength detector 262 and also outputs the CW light to the second wavelength detector 264.

Figure 7:
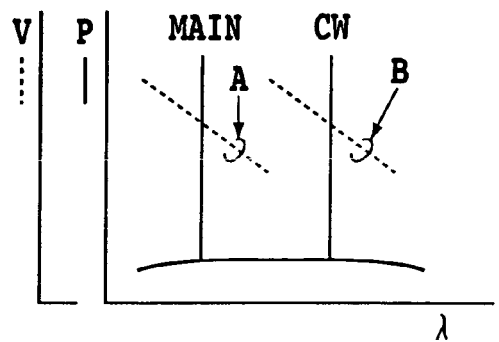
FIG. 7 is a diagram showing filter characteristics of first and second wavelength detectors.

FIG. 7 is a diagram showing filter characteristics of the first and second wavelength detectors 262, 264. In FIG. 7, the horizontal axis represents the wavelength λ, and a vertical axis P represents power and a vertical axis V filter characteristics. The first wavelength detector 262 includes a filter having inherent filter characteristics indicated by the broken line A in FIG. 7 with respect to the wavelengths in the band of the main signal, and converts inherent optical power corresponding to a wavelength λ1 of the main signal into an electric signal (voltage). The second wavelength detector 264 includes a filter having inherent filter characteristics indicated by the broken line B in FIG. 7 with respect to the wavelengths in the band of the CW light, and converts inherent optical power corresponding to a wavelength λ2 of the CW light into an electric signal (voltage).

If the wavelength of the CW light is spaced a certain interval from the wavelength of the main signal, then the filter characteristics of the first and second wavelength detectors 262, 264 are selected such that output signal levels (voltages) of the first and second wavelength detectors 262, 264 are equal to each other. The subtractor 266 determines the difference between the output electric signals from the first and second wavelength detectors 262, 264. Since the output of subtractor 266 is nil if the difference between the wavelength λ2 of the CW light and the wavelength λ1 of the main signal is a predetermined value, the output signal from the subtractor 266 represents a shift of the wavelength λ2 from the wavelength λ1. To keep constant the difference between the wavelength λ2 and the wavelength λ1, the operational amplifier 268 outputs an electric signal corresponding to the wavelength shift to change the wavelength of the CW light, e.g., a signal to increase/reduce the LD chip temperature. The wavelength of the optical signal and the wavelength of the CW light should preferably be spaced apart from each other to the extent which is permitted by the wavelength range of the photodetector. Roughly, the CW light needs to be spaced a sufficient interval ($\geqq 100$ times) from the spectral range of wavelengths modulated by the optical signal (e.g., 2.4 G: ±20 pm, 10 G: ±80 pm for the main signal in the 1.55µ band).

Figure 8:
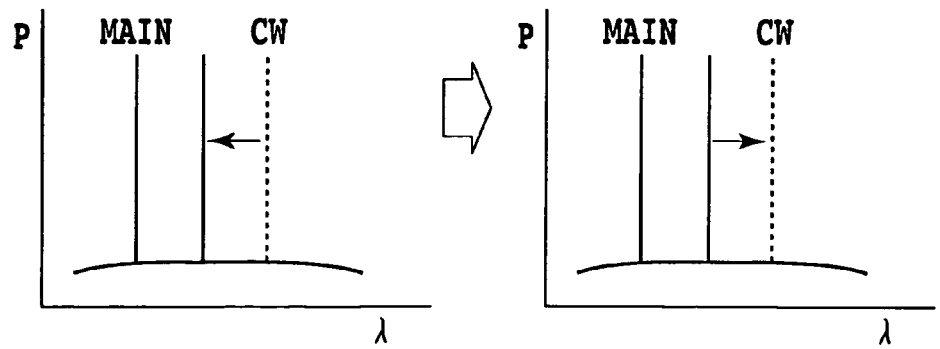
FIG. 8 is a diagram illustrating a control process of a controller in the light source device shown in FIG. 5.

FIG. 8 is a diagram illustrating a control process of the controller 252. The controller 252 outputs a control current, generated from the output signal from the detector 254, to the CW light source 250 in order to make constant the difference between the main signal wavelength $\lambda 1$ and the CW light wavelength $\lambda 2$. For example, if the wavelength of the CW light drifts toward the wavelength of the main signal, then the controller 252 shifts the wavelength of the CW light so as to be spaced a certain interval from the wavelength of the main signal. Similarly, if the wavelength of the CW light drifts away from the wavelength of the main signal, then the controller 252 shifts the wavelength of the CW light toward the wavelength of the main signal. The controller 252 also controls the level converter 256 to set the optical electric power $\Delta P$ of the CW light to a desired value. The second CW light source 250 has its wavelength controlled by the control signal. The beat noise of the signal light output from the mixer 210 is thus suppressed. Other operational details of the light source device according to the second embodiment are identical to those of the light source device according to the first embodiment, and will not be described below.

Third Embodiment

Figure 9:
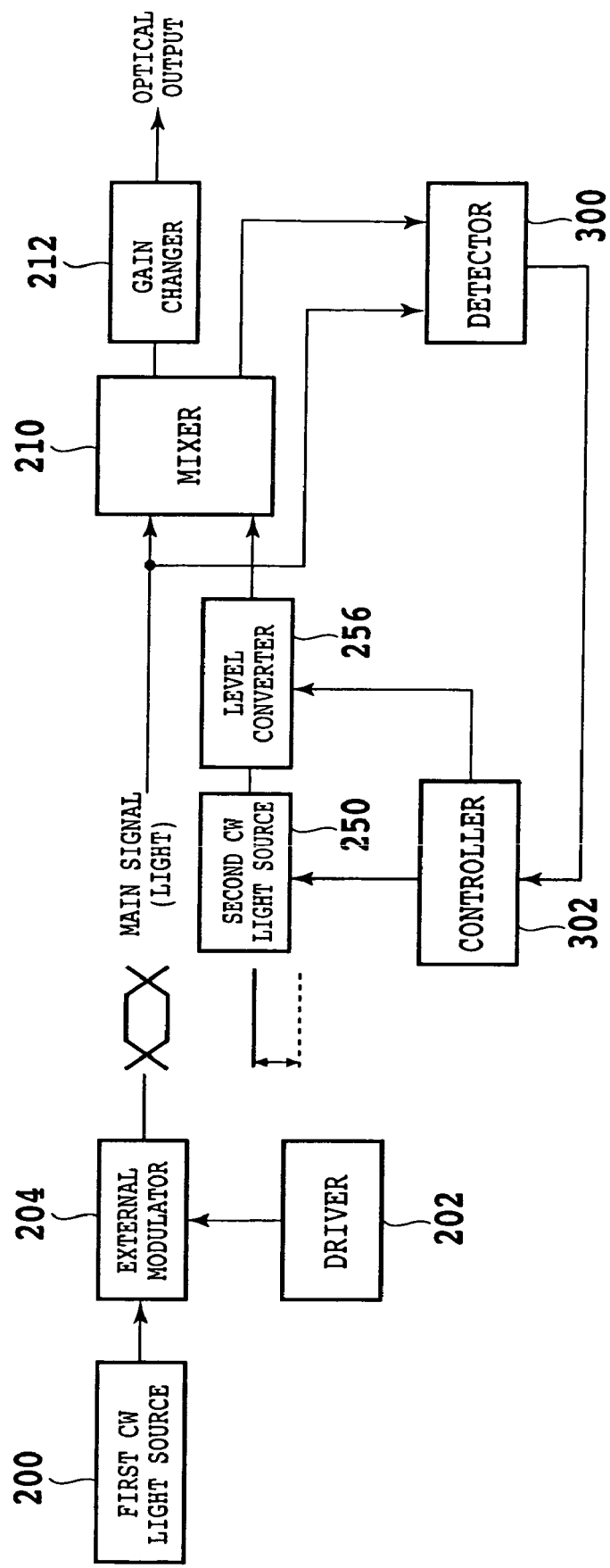
FIG. 9 is a diagram of a light source device according to a third embodiment of the present invention.

FIG. 9 is a diagram of a light source device according to a third embodiment of the present invention. Those parts of the light source device according to the second embodiment which are identical to those of the light source device shown in FIG. 2 are denoted by identical reference characters. According to the present embodiment, as with the second embodiment, a function to control the wavelength of the second CW light source 250 so that no beat noise will be included in the output signal light from the mixer 210 is added to the light source device shown in FIG. 9, but a method of controlling the second CW light source 250 differs from the second embodiment. The beat noise is present as degrading an eye pattern or the like. According to the present invention, a degradation of the output signal light from the mixer 210, e.g., a degradation of an eye pattern, is detected, and the wavelength of the DC light from the second CW light source 250 is controlled to suppress the degradation. A detector 300 compares the optical main signal output from the external modulator 204 with the output signal light from the mixer 210 to detect the extent of the degradation of the optical signal, and outputs the detected extent of the degradation to a controller 302. Specifically, the detector 300 compares high and low power levels determined from the extinction ratio of the optical main signal and the power $\Delta P$ of the CW light as expected values of the output signal light from the mixer 210 with high and low power levels of the output signal light from the mixer 210, thereby detecting a bit error due to the beat noise. The controller 302 controls the wavelength of the DC light of the second CW light source 250 to be shifted in a direction to suppress the degradation of the main signal depending on the degradation of the main signal. In this manner, the mixer 210 outputs high-quality signal light having a desired extinction ratio where the degradation of the main signal is suppressed.

Fourth Embodiment

Figure 10:
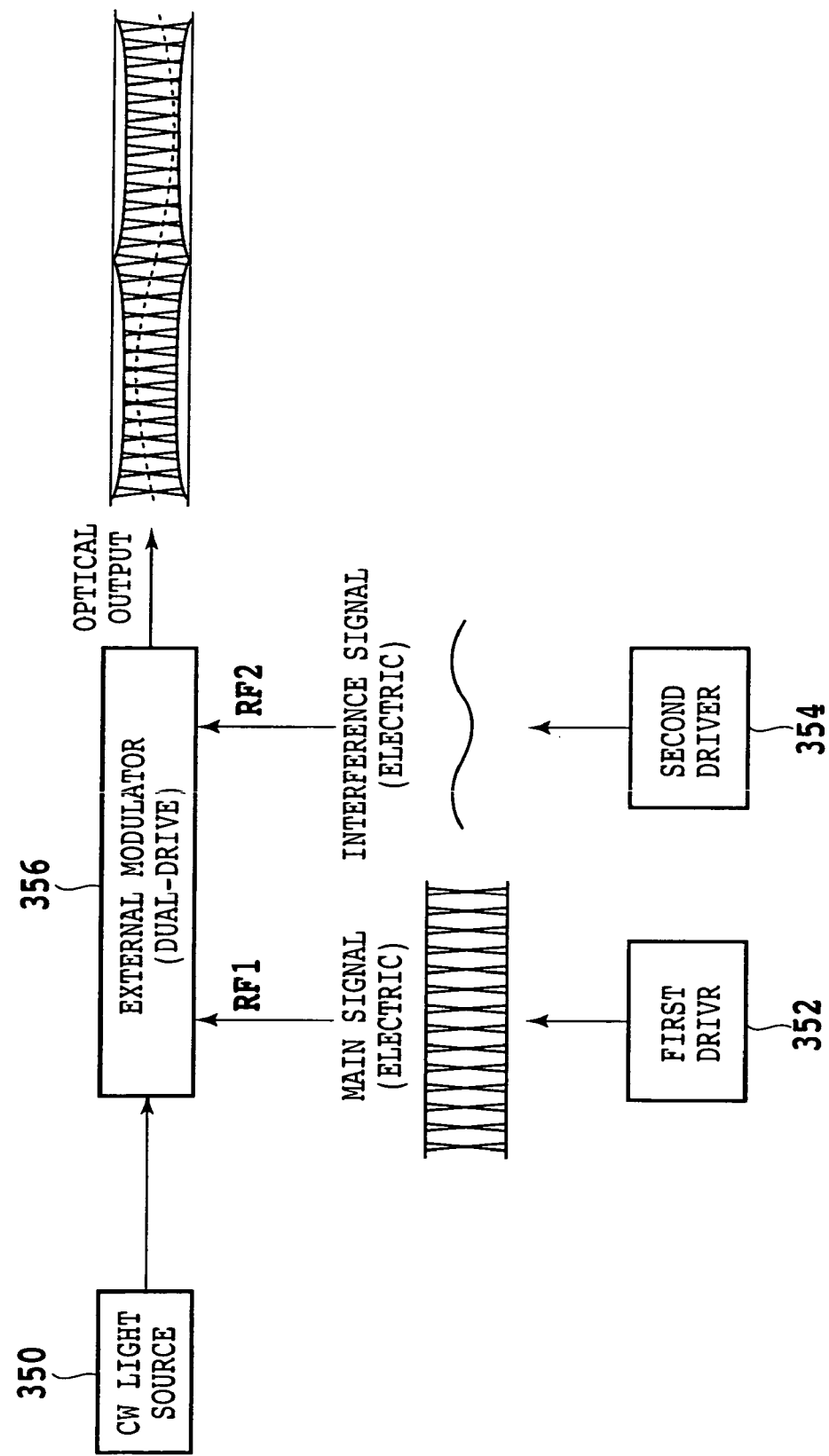
FIG. 10 is a diagram of a light source device according to a fourth embodiment of the present invention.

FIG. 10 is a diagram of a light source device according to a fourth embodiment of the present invention. As shown in FIG. 10, the light source device has a CW light source 350, a first driver 352, a second driver 354, and an external modulator 356. The CW light source 350 emits DC light. The first driver 352 outputs a drive voltage of a main signal (electric) having a waveform shown in FIG. 10. The second driver 354 outputs a drive voltage of an interference signal (electric) having a waveform shown in FIG. 10. The interference signal is of a sine wave or a pulse wave having an amplitude smaller than the main signal and a constant period. The external modulator 356 comprises a dual-drive modulator for modulating the DC light from the light source 350 with the main signal (electric) and the interference signal (electric), and outputting an optical signal having a waveform shown in FIG. 10. By appropriately selecting an amplitude level of the interference signal, the interference signal can be superposed so as not to affect the extinction ratio, as described below.

Figure 11:
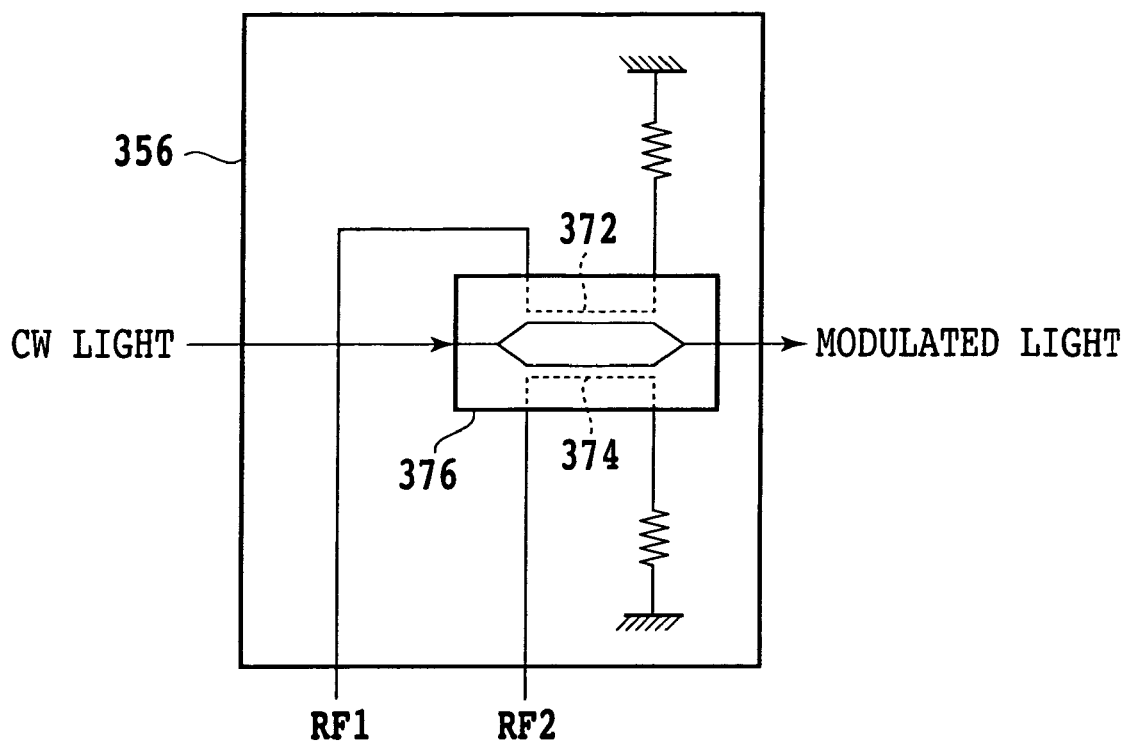
FIG. 11 is a diagram of an external modulator in the light source device shown in FIG. 10.

FIG. 11 is a diagram illustrating impedance matching of the external modulator 356. As shown in FIG. 11, the external modulator 356 comprises a Mach-Zehnder interferometer, and has a signal line (electrode) 372 for inputting RF1 (main signal) and a signal line (electrode) 374 for inputting RF2 (interference signal) to modulate light based on an electro-optic effect. The signal lines 372, 374 are terminated by respective resistors of 50 $\Omega$ for impedance matching. The external modulator 356 is used for the following reasons: (1) For mixing an electric main signal and an electric interference signal, it is difficult to achieve impedance matching and adjust RF characteristics. The external modulator 356 is able to separately input these signals without mixing them. Since the signal lines for inputting the electric main signal and the electric interference signal are terminated by the respective resistors of 50 $\Omega$, as shown in FIG. 11, impedance matching can easily be achieved. The light source device can easily be designed because the sections for inputting the main signal and the interference signal to the external modulators 356 can individually be analyzed. (2) The interference signal and the main signal are not combined with each other, but the external modulator 356 modulates the CW light with the main signal and the interference signal, so that the extinction ratio will not change, as described below.

When the main signal (RF) output from the first driver 352 and the interference signal output from the second driver 354 are input respectively as RF1, RF2 to the external modulator 356 shown in FIG. 10, the external modulator 356 outputs an optical signal waveform shown in FIG. 10. For an easier understanding of operation of the external modulator 356, a single-drive external modulator 388 shown in FIG. 12 will be described below.

Figure 12:
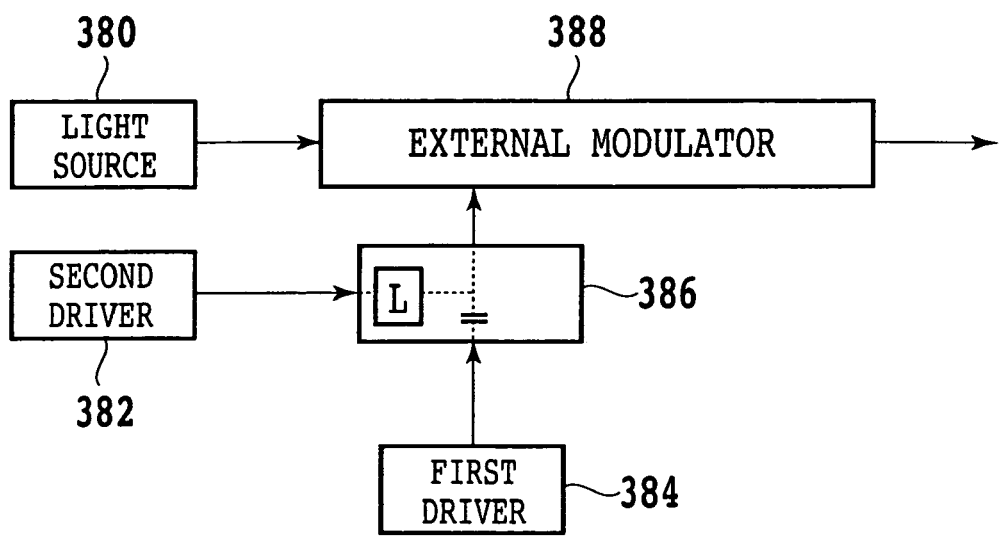
FIG. 12 is a diagram illustrating operation of the light source device shown in FIG. 10.
Figure 13:
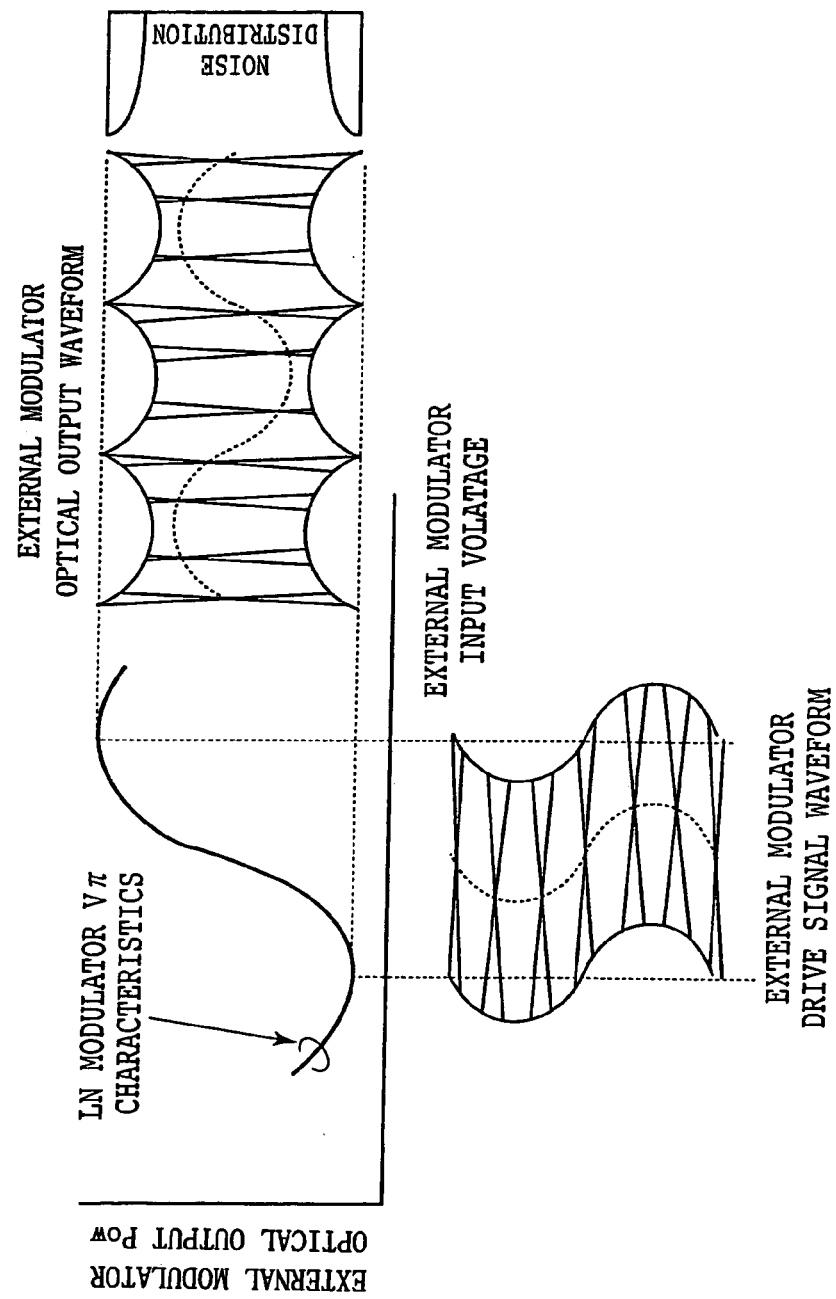
FIG. 13 is a diagram illustrating operation of the light source device shown in FIG. 10.

FIG. 12 is a diagram showing a single-drive external modulator which is equivalent to the external modulator 356. FIG. 13 is a diagram showing the waveforms of signals in the single-drive external modulator, specifically, an external modulator drive signal waveform, LN modulator V$\pi$ characteristics, and an external modulator output signal waveform. The external modulators shown in FIGS. 10 and 12 are operationally equivalent to each other. A main signal output from a first driver 384 is amplitude-modulated by a bias tee 386 with noise from a second driver 382, producing an external modulator drive signal waveform which is input to the external modulator 388. The signal component from the second driver 382 modulates an operating point of the external modulator 388 which is indicated by the LN modulator V$\pi$ characteristics, thereby producing an external modulator optical output waveform shown in FIG. 13. At this time, since high and low noise levels are distributed as shown in FIG. 13, the extinction ratio is not changed even if an interference signal is superposed.

Fifth Embodiment

Figure 14:
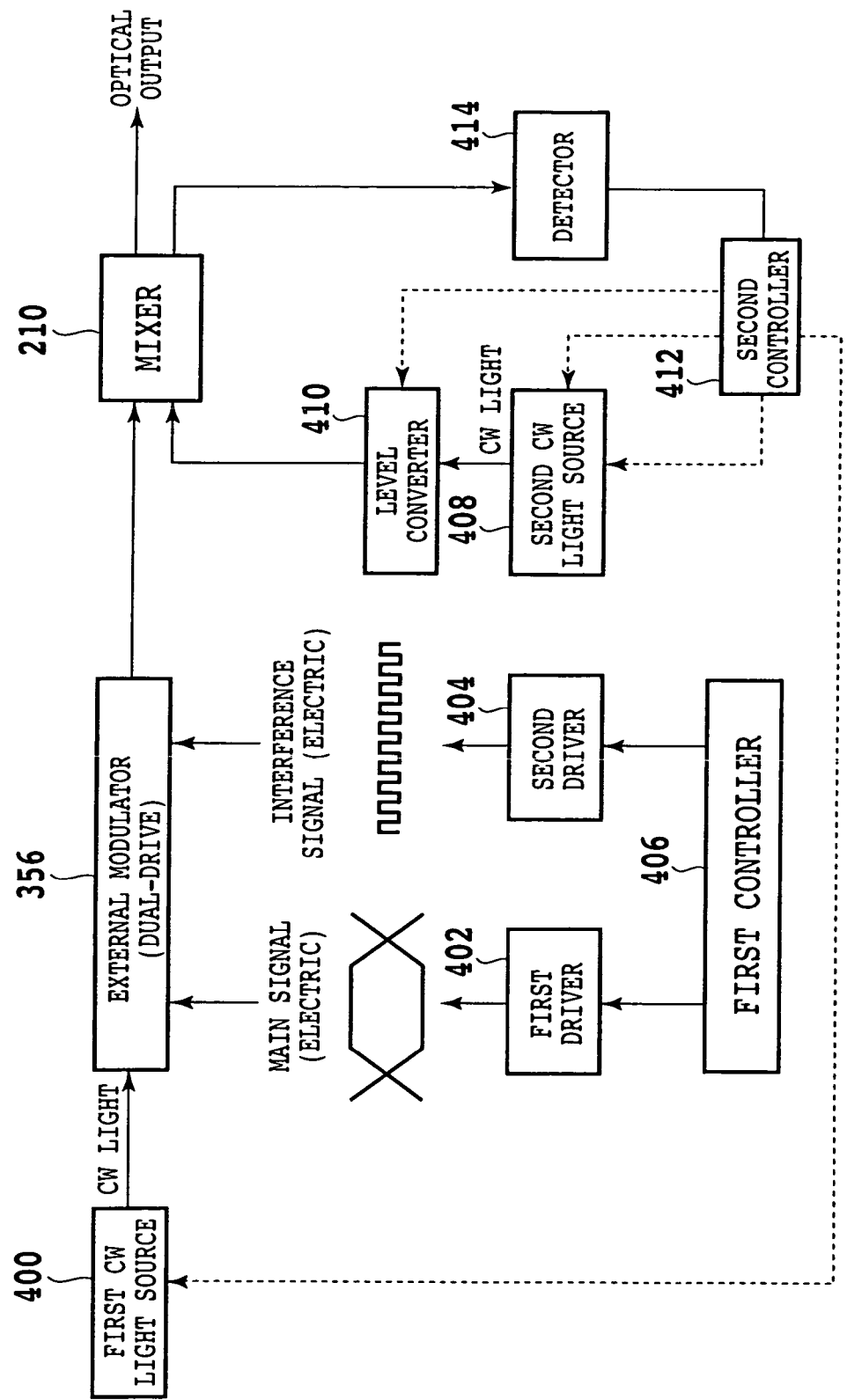
FIG. 14 is a diagram of a light source device according to a fifth embodiment of the present invention.
Figure 15:
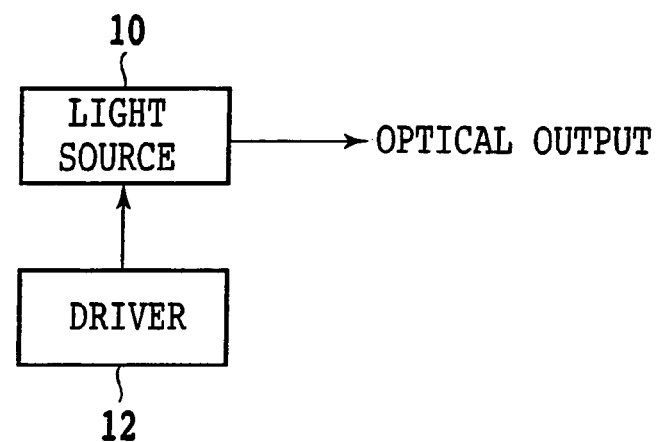
FIG. 15 is a diagram of a direct modulation system.
Figure 16:
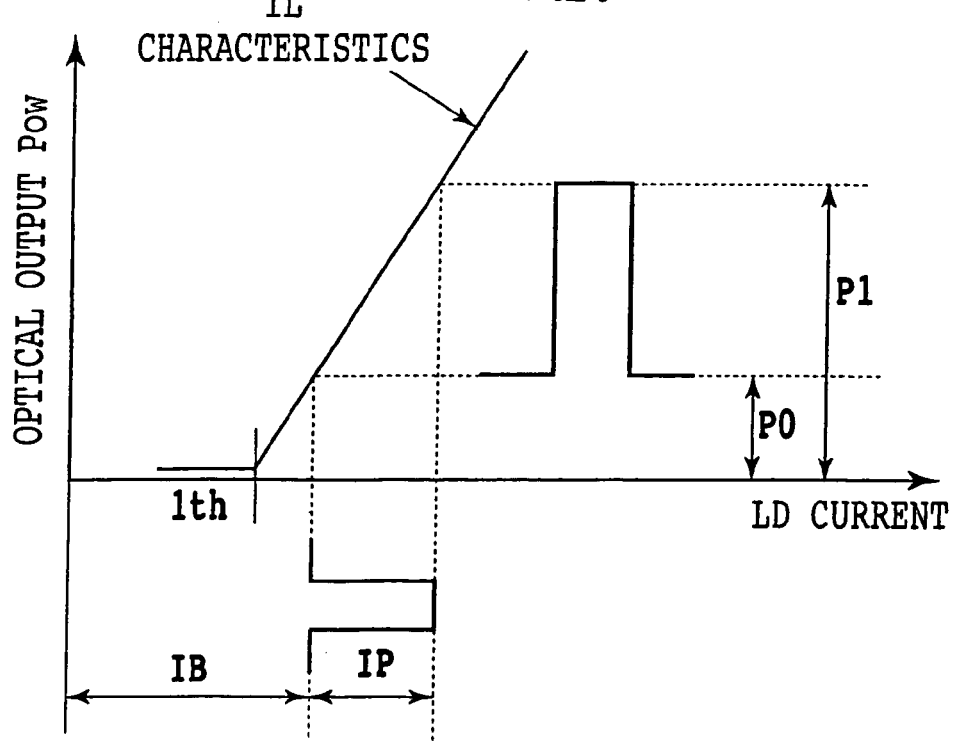
FIG. 16 is a diagram illustrating operation of the direct modulation system.
Figure 17:
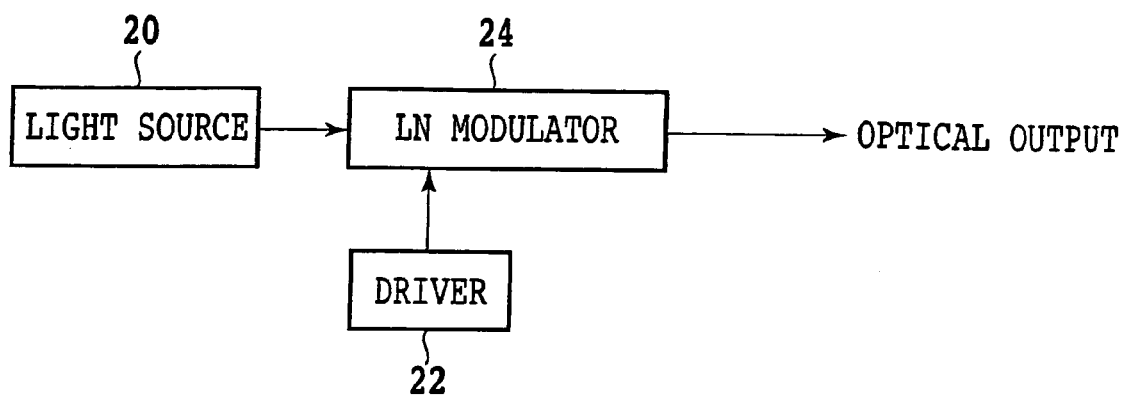
FIG. 17 is a diagram of an LN modulation system.
Figure 18:
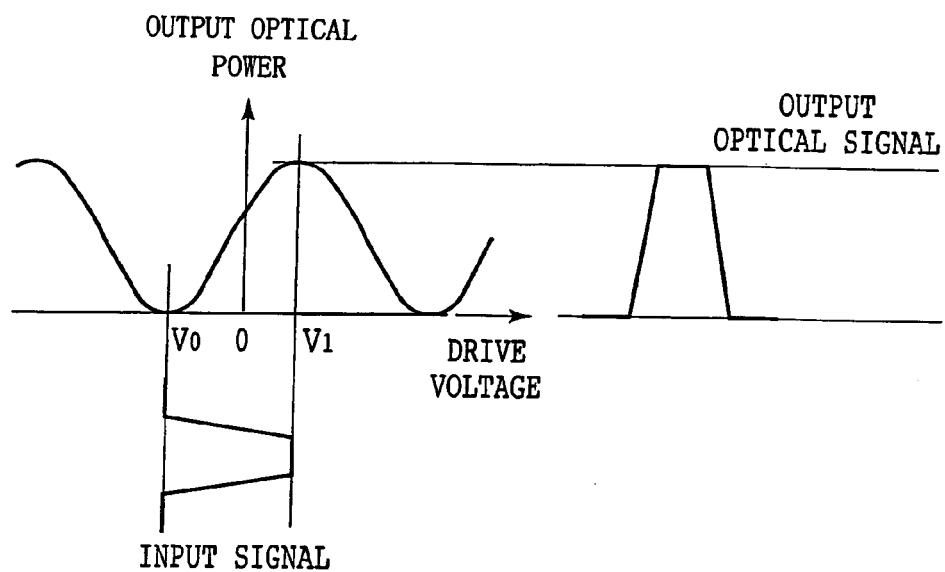
FIG. 18 is a diagram illustrating operation of the LN modulation system.
Figure 19:
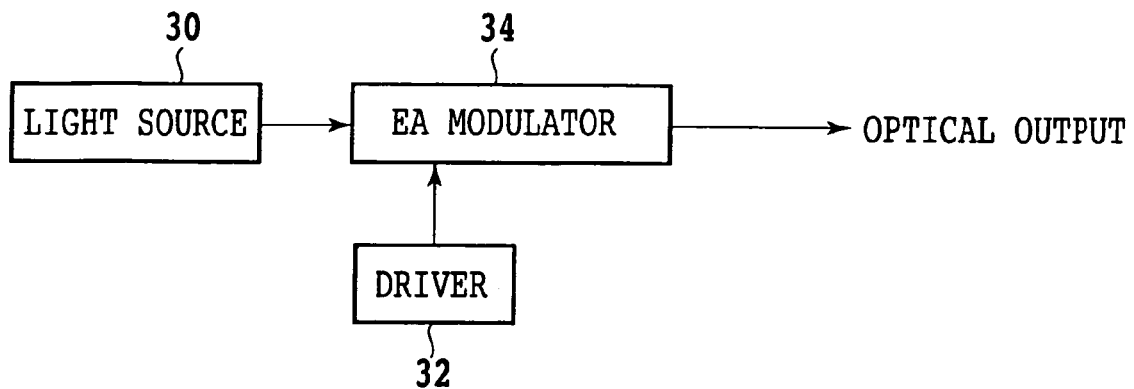
FIG. 19 is a diagram of an EA modulation system.
Figure 20:
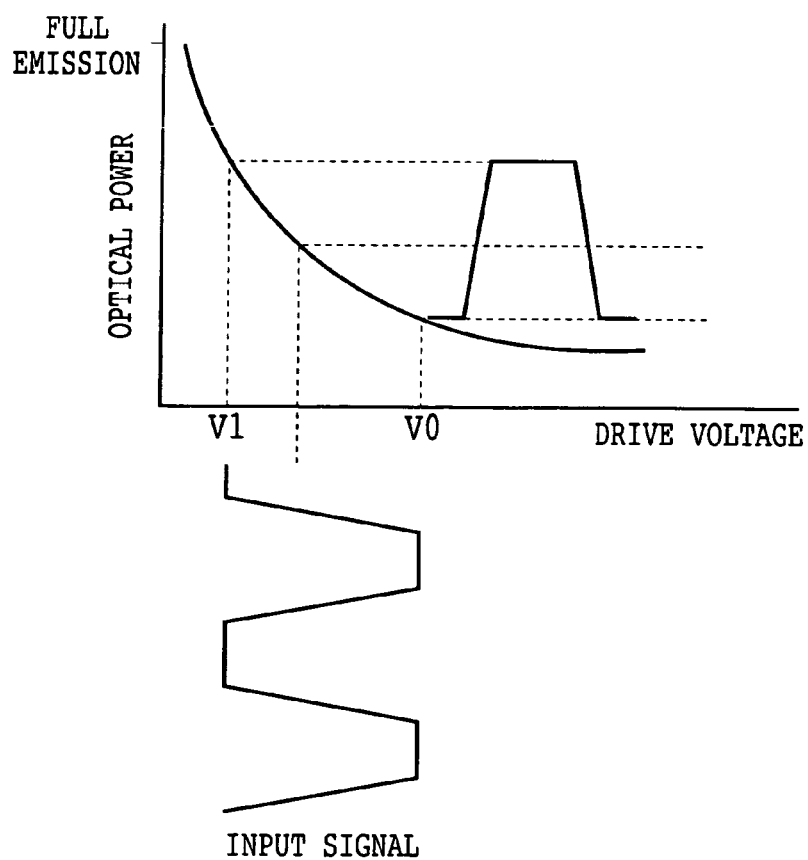
FIG. 20 is a diagram illustrating operation of the EA modulation system.
Figure 21:
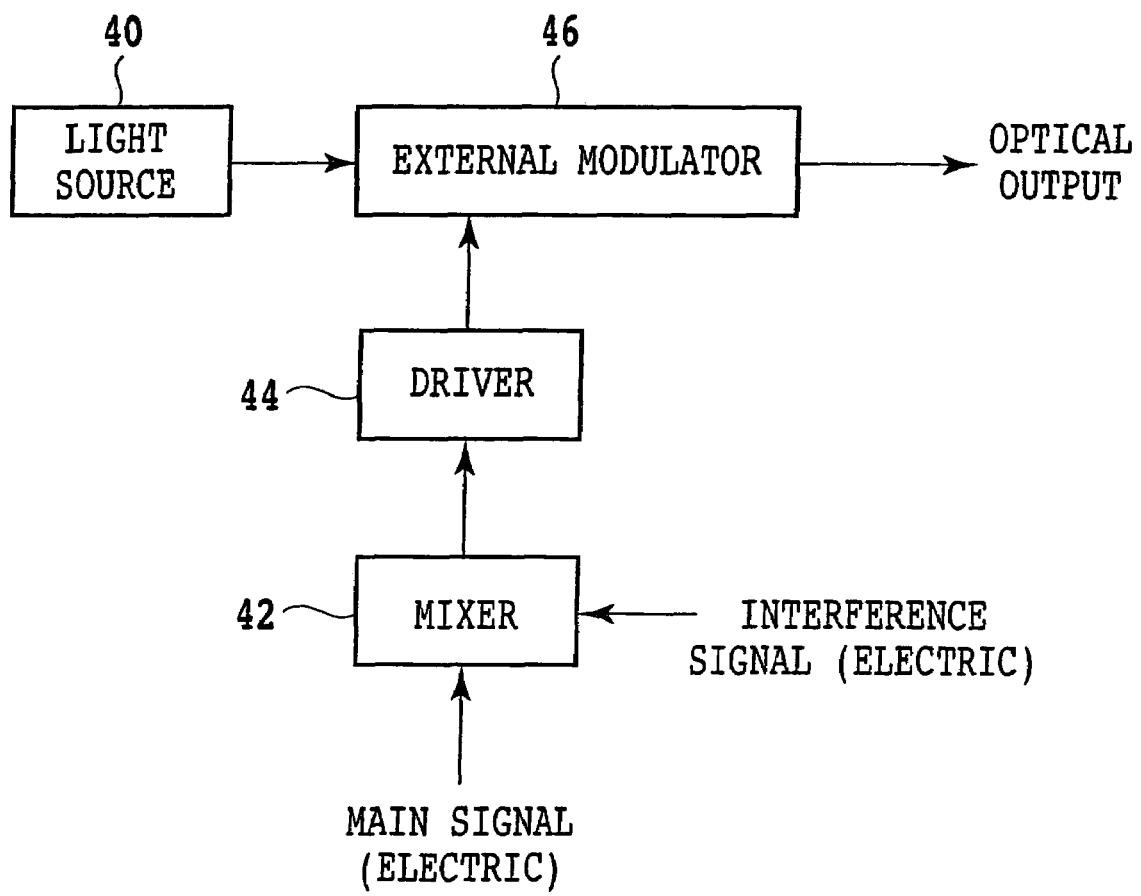
FIG. 21 is a diagram illustrating a conventional method of superposing noise.
Figure 22:
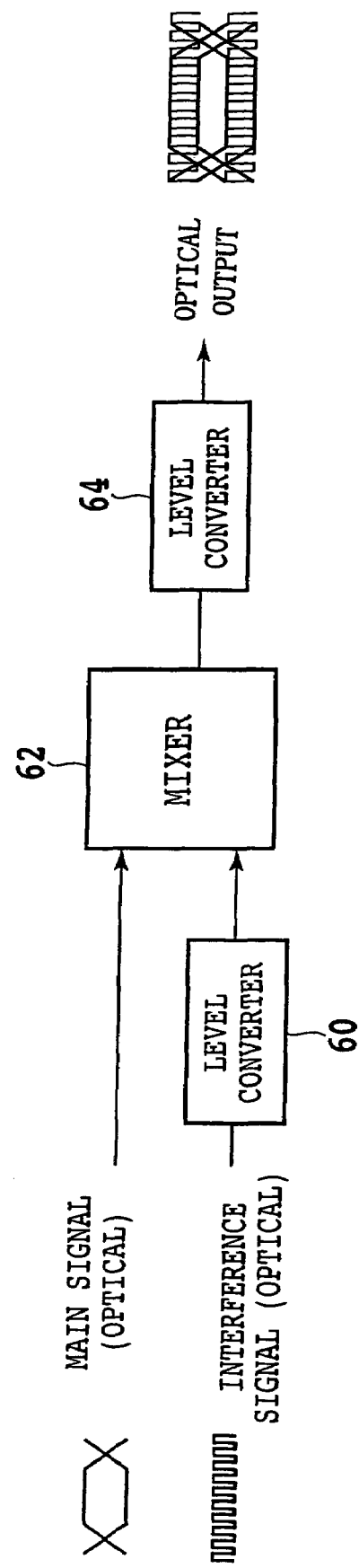
FIG. 22 is a diagram illustrating another conventional method of superposing noise.

FIG. 14 is a diagram of a light source device according to a fifth embodiment of the present invention. Those parts of the light source device according to the fourth embodiment which are identical to those of the light source devices shown in FIGS. 5 and 10 are denoted by identical reference characters. As shown in FIG. 14, the light source device has a first CW light source 400, a first driver 402, a second driver 404, an external modulator 356, a first controller 406, a second controller 412, a second CW light source 408, a level converter 410, a mixer 210, and a detector 414. The first CW light source 400 has its CW light power controlled by the second controller 412. The first driver 402 has its bias voltage controlled by the first controller 406 and outputs a drive voltage of a main signal (electric). The second driver 404 has its bias voltage controlled by the first controller 406 and outputs a drive voltage of an interference signal (electric). The first controller 406 controls the bias voltages that are applied by the first driver 402 and the second driver 404 to the external modulator 356. The second CW light source 408 has its CW light power controlled by the second controller 412. The level converter 410 has its conversion level controlled by the second controller 412.

The second controller 412 has the following function: The second controller 412 is supplied with the intensity of an optical output signal of the mixer 210 which is output from the detector 414, and controls the power levels of the CW light of the first CW light source 400 and the second CW light source 408 and the conversion level of the level converter 410 so that the average value of the optical output power will be constant. The detector 414 detects the power of the optical output signal of the mixer 210. The average value of the power of the optical output signal of the mixer 210 can thus be kept constant, making the light source device high in quality. The detector 414 may detect the amplitude level of the optical output signal of the mixer 210, and the second controller 412 may control the power of the DC light from the second CW light source 408 and the conversion level of the level converter 410 for keeping the extinction ratio of the output light constant. The second embodiment may be combined with the third embodiment and the fourth embodiment.

According to the present invention, the extinction ratio may be set to a random value without degrading the characteristics of the waveform of the transmitted optical signal. Furthermore, a light source device which is of a simple arrangement and high quality for meeting demands for intentionally superposing noise to degrade the waveform of the transmitted optical signal can be provided for use in applications where such demands are to be met.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A light source device comprising:
    a CW light source for emitting a first DC light;
    a level converter for converting an optical power of the first DC light into a second DC light and outputting the second DC light;
    a mixer for mixing an optical main signal having a constant extinction ratio with the second DC light and outputting a mixed optical main signal light;
    a detector for comparing the optical main signal with the mixed optical main signal light to detect beat noise included in the mixed optical main signal light; and
    a controller for controlling the wavelength of the first DC light to suppress the beat noise detected by the detector;
    wherein the wavelength of the first DC light emitted by the CW light source is controlled by the controller.

2. A light source device according to claim 1, wherein the detector compares the optical main signal supplied to the mixer and the mixed optical main signal light from the mixer with each other to detect a bit error due to beat noise.

* * * * *

UNITED STATES PATENT AND TRADEMARK OFFICE
CERTIFICATE OF CORRECTION

PATENT NO. : 7,421,211 B2  Page 1 of 1
APPLICATION NO. : 11/054554
DATED : September 2, 2008
INVENTOR(S) : Akihiko Hayashi et al.

It is certified that error appears in the above-identified patent and that said Letters Patent is hereby corrected as shown below:

First Page, Column 2 (Abstract), Line 1, change "continous" to --continuous--.

Signed and Sealed this

Ninth Day of December, 2008

JON W. DUDAS
*Director of the United States Patent and Trademark Office*